United States Patent [19]

Ingram et al.

[11] Patent Number: 5,782,435
[45] Date of Patent: Jul. 21, 1998

[54] ELECTRO-MAGNETIC EXPULSION DE-ICING SYSTEM

[75] Inventors: Richard B. Ingram; Gerald W. Codner, both of Ithaca; Joseph J. Gerardi, Dryden, all of N.Y.

[73] Assignee: Cox & Company, Inc., New York, N.Y.

[21] Appl. No.: 449,628

[22] Filed: May 24, 1995

[51] Int. Cl.⁶ ............................... B64D 15/16; H01F 7/08
[52] U.S. Cl. .................. 244/134 D; 244/134 A; 335/226
[58] Field of Search .................. 244/134 A, 134 D, 244/134 R; 335/229, 226

[56] References Cited

U.S. PATENT DOCUMENTS

| | | | |
|---|---|---|---|
| 4,399,967 | 8/1983 | Sandorff | 244/134 R |
| 4,690,353 | 9/1987 | Haslim et al. | 244/134 D |
| 4,875,644 | 10/1989 | Adams et al. | 244/134 D |
| 4,894,569 | 1/1990 | Lardiere, Jr. et al. | 244/134 D |
| 5,074,497 | 12/1991 | Phillips, II | 244/134 A |
| 5,129,598 | 7/1992 | Adams et al. | 244/134 D |
| 5,143,325 | 9/1992 | Zieve et al. | 244/134 D |
| 5,152,480 | 10/1992 | Adams et al. | 244/134 D |
| 5,191,791 | 3/1993 | Gereardi et al. | 73/178 R |
| 5,288,355 | 2/1994 | Leffel et al. | 244/134 D |

Primary Examiner—Virna Lissi Mojica

[57] ABSTRACT

The present invention is de-icing system that uses electromagnetic actuators mounted within the airfoil of an aircraft to effect de-icing. Advantageously, the actuators have low voltage and current requirements. Each actuator includes conductive strips fabricated on a flexible dielectric sheet. The conductive strips are wound into coils with the actuator shaped into a flattened elongated tube. The axis of the winding coils is coincident with the longitudinal axis of the elongated tube.

52 Claims, 14 Drawing Sheets

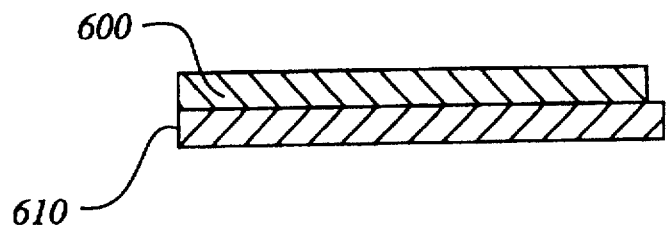
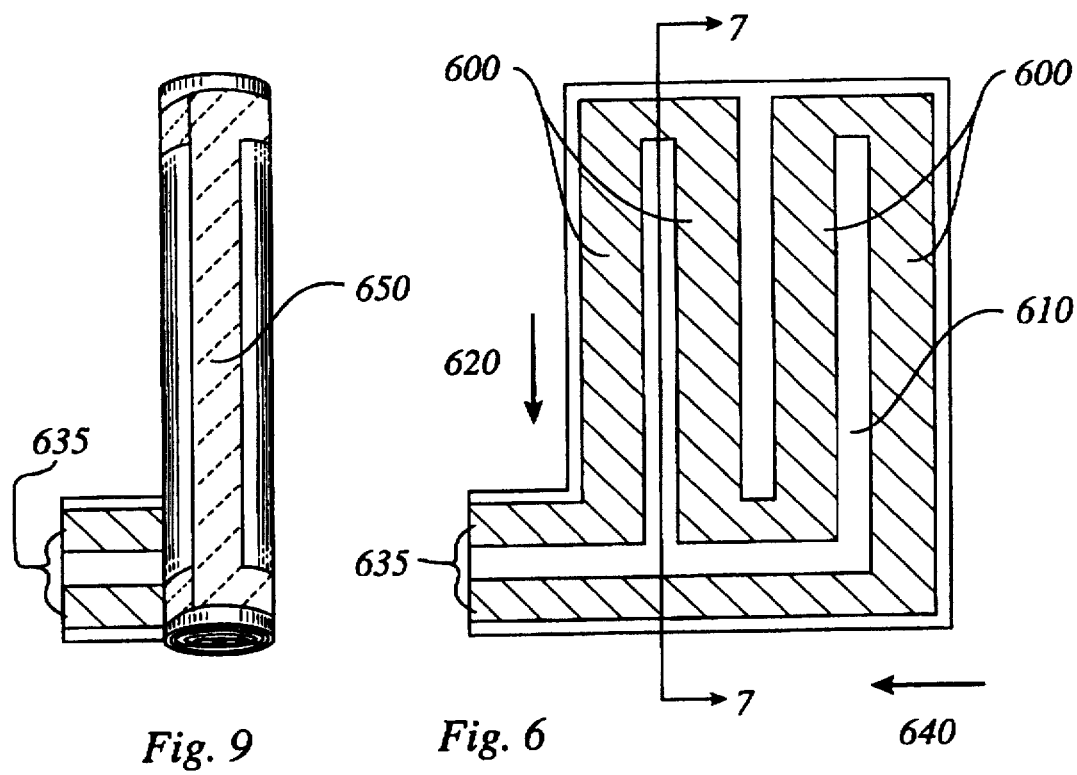
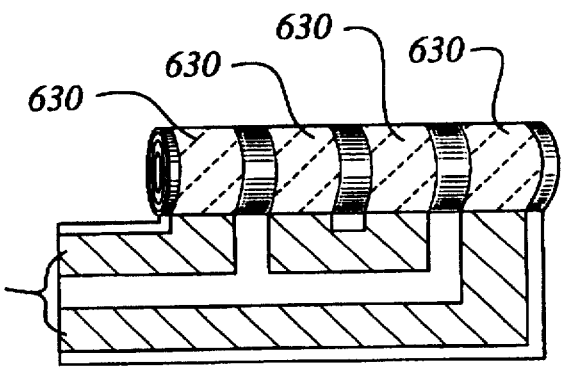
Fig. 7
Fig. 9
Fig. 6
Fig. 8

ELECTRO-MAGNETIC EXPULSION DE-ICING SYSTEM

STATEMENT REGARDING GOVERNMENT FUNDED RESEARCH

This invention was made with Government support under Contract No. DAAH01-94-C-R146 awarded by the Advanced Research Projects Agency (DOD). The Government has certain rights in this invention.

TECHNICAL FIELD

The present invention relates to a de-icing system for an airplane and, more particularly, to a de-icing system that employs electro-magnetic expulsion actuators.

BACKGROUND OF THE INVENTION

Aircraft icing is known to occur on aircraft wing and tail surfaces when the aircraft is airborne as well as when the aircraft is stationary on the ground. Airborne icing generally occurs on the leading edges of the wings when the surface temperature is at or below freezing. Unfortunately, this can occur at any time of the year when there is moisture or precipitation and when the aircraft is at or above its freezing altitude. Such airborne ice accretion, or buildup, can have deleterious effects-on flight performance: lift decreases, thrust falls off, drag and weight increase, and stall speed dramatically increases. In recent years, undetected airborne icing has contributed to a number of catastrophic crashes and continues to threaten general aviation and high performance commercial jet aircraft.

In the prior art, several de-icing and anti-icing systems have been developed to combat the general problem of aircraft icing. Such systems are typically classified in accordance with the means used to prevent or remove the icing— either thermal, chemical or mechanical. Further, de-icing and anti-icing systems differ in their method of operation.

At present, two types of thermal anti-icing systems are currently in use. Each type heats ice prone surfaces to a temperature sufficient to prevent the formation of ice. The two basic thermal systems are the so-called "bleed air" and electro-thermal systems. The former uses the exhaust gas from the aircraft to heat air then fed into cavities behind ice prone areas so as to melt the ice or prevent it from forming. Although these anti-icing systems are reliable, they generally consume a great deal of energy in operation.

In contrast, electro-thermal systems use resistive elements embedded within thin sheets of material placed over and/or under the ice prone surfaces. Electricity supplied from a power source and passed through the resistive elements generates heat sufficient to melt the ice. Such electro-thermal systems likewise are inefficient. Moreover, attempts to minimize the energy consumption by melting the ice periodically, rather than continuously, often leads to 'runback re-freeze," a condition whereby water from the melting ice flows to adjacent areas on the airfoil and refreezes.

Other systems have been attempted to solve the disadvantages of thermal de-icing system. For example, so-called "weeping wing" systems have been developed. A chemical, such as an antifreeze solution, is pumped through distributed capillaries that exits over the ice prone surfaces. The antifreeze solution prevents the ice from forming. However, to do so the system must be in operation prior to the aircraft encountering icing. Such a limited effectiveness coupled with the environmental concerns of introducing such chemicals into the environment reduces the desirability of such systems.

De-icing systems, unlike anti-icing systems which prevent the formation of ice, debond the ice accretion from the surface of the aircraft. They generally exist in the form of pneumatic or electro-magnetic impulse actuators.

Pneumatic systems utilize inflatable rubber bladders, such that when they expand, ice is sheared, cracked and flaked off. The actuator part of the device is installed as a thin cap (a boot) that covers the ice prone area. Rubber pneumatic de-icer boots are widely used, but are unfortunately prone to damage from weather and foreign objects—typically having a service life of 2–5 years. Further, they cannot effectively remove thin layers of ice less than 0.25." One alternative pneumatic system under development utilizes a high pressure pneumatic pulse that causes the icing surface to move with a high acceleration and low displacement. Although attractive, this type of system requires a considerable amount of auxiliary equipment and as such is expensive. Further, although such systems use erosion resistant polymers, the durability falls far short of those systems using metals.

Electro-magnetic de-icing systems have also been widely investigated. See, for example, U.S. Pat. Nos. 4,690,353 and 5,129,598 which are incorporated herein by reference. They perform in substantially the same manner as the above pneumatic system, but use current induced magnetic effects that results in either surface vibrations or strong pulses to effect de-icing. For example, in U.S. Pat. No. 4,690,353, Haslim et al. describe an electro-expulsive separation system in which an elastomeric covering referred to as a blanket, cuff, or boot is placed on an aircraft surface. Mutually repelling conductors are employed that distend the blanket abruptly when a current is applied, thus propelling ice off the protected surface. More specifically, current discharged into the conductors gives rise to magnetic fields of like polarity that result in an electro-mechanical excitation. However, to obtain the required expulsion force, an extremely high current flow through the conductors is required. Such a current flow may be generated by capacitively storing and then discharging a high charge through the conductors. To effect discharge, high current silicon control rectifiers must be used. Such high power rectifiers are, however, bulky and costly. Moreover, to achieve such high currents for actuators of a practical size, high voltages must be used, making the system susceptible to internal shorting. At modest current levels, the expulsion force affords a limited de-icing capability. Also, these systems generally require an auxiliary mechanism to eliminate "auto-inflation" that results when polymer boots having internal hollow voids are used to make the system more effective using modest current levels.

One alternative electro-magnetic de-icing system uses induced eddy currents in, for example, the surface of the leading edges of metal airfoils to effect de-icing. See, for example, U.S. Pat. Nos. 4,399,967 and 5,129,598, which are incorporated herein by reference. Although electromagnetic de-icing systems are capable of removing very thin layers of ice and their performance is generally superior to pneumatic de-icers, they generally suffer from some or all of the following problems: limited distribution of the de-icing effect, auto-inflation, low power efficiency and limited service life.

Accordingly, there exists a need for a low cost, low weight improved electro-magnetic expulsion de-icing system having modest voltage and current requirements.

SUMMARY OF THE INVENTION

The present invention is a de-icing system that uses electro-magnetic actuator(s) mounted within the airfoil of an aircraft to effect de-icing. Advantageously, the actuators have low voltage and current requirements due primarily to the high number of coil windings used. Each actuator includes conductive strip(s) fabricated on a flexible dielectric sheet. The dielectric sheet is rolled into a flattened elongated tube such that the conductive strip(s) are wound into coil(s), with the axis of the winding coil(s) coincident to the longitudinal axis of the elongated tube. Importantly, the elongated shape of the tube constraints the coil windings from displacing along the longitudinal axis. Advantageously, such actuator coils, even with a high number of windings, can be actuated several tens of thousands of times without malfunctioning. The elongated tube may be selectively bonded within corrugated channels of a housing, which channels run in a spanwise and/or chordwise direction along an airfoil. Moreover, the housing may be integrated with the leading edge structure or shaped to conform to fit over the original shape of the airfoil.

Preferably, the axis of the coil windings are located substantially parallel to and beneath ice prone surfaces of an airfoil, such as the leading edges. The actuator and housing supporting it are covered with a protective semi-rigid sheet.

Preferably, the present invention includes driver electronics for each actuator or desired group of actuators. In particular, the driver electronics includes a capacitive storage bank, a silicon control rectifier switch, a charging circuit and a control module.

In operation, the charging circuit charges the capacitive storage bank. When ice is detected on the airfoil, the control module triggers the SCR which in turn causes an instantaneous current to be discharged through the coil(s) of the actuator(s). The interaction between the current in the windings of the coil results in an impulsive electro-magnetic force, F, or excitation that causes the coil to rapidly expand from its flattened shape to a more oval shape. This expansion in turn exerts an impulsive force on the surface of the semi-rigid sheet which then distends and recoils, thereby expelling any ice accretions on the surface thereof. Once actuated, the coil returns to its original shape due to the elasticity of the tube, and the tension exerted inwardly by the semi-rigid sheet.

Conventional circuit board fabrication techniques, such as masking and etching techniques, may be used to fabricate the conductive strips in a serpentine or digitated pattern. The serpentine or digitated pattern of conductive strips once rolled along a desired direction forms an elongated tube having parallel spaced apart coils. A strip of VHB strength transfer adhesive tape bonds the last two windings together to prevent the coils from unwinding. With the tube flattened into an elongated shape, it is then heat treated so that the windings on the sides of the coils and the dielectric sheet act as a spring to assist it in returning to its original shape after being actuated.

Various serpentine or digitated patterns may be used, including those having a redundancy configuration. In the event of a failure of the primary coil(s), the redundant coil(s) may be used to effect de-icing.

Further, the present actuators may employ and contact to a power bus comprising alternating layers of conductive and dielectric layers. Also, to enhance the electro-magnetic expulsion force of the coils, the conductive strips may have various geometrical shapes, including those varying in a taper and undulating fashion.

BRIEF DESCRIPTION OF THE DRAWINGS

The features and advantages of the present invention will become more readily apparent from the following detailed description of the invention in which like elements are labelled similarly and in which:

FIG. 6 depicts one exemplary digitated pattern used in fabricating an electro-magnetic expulsion de-icing actuator in accordance with the principles of the invention;

FIG. 7 depicts a cross sectional view of the digitated pattern and dielectric sheet taken along line 7—7 in FIG. 6;

FIG. 8 depicts an electro-magnetic expulsion de-icing actuator formed from the serpentine or digitated pattern of FIG. 6;

FIG. 9 depicts an alternative electro-magnetic expulsion de-icing actuator formed from the serpentine or digitated pattern of FIG. 6;

DETAILED DESCRIPTION OF THE INVENTION

Figure 1:
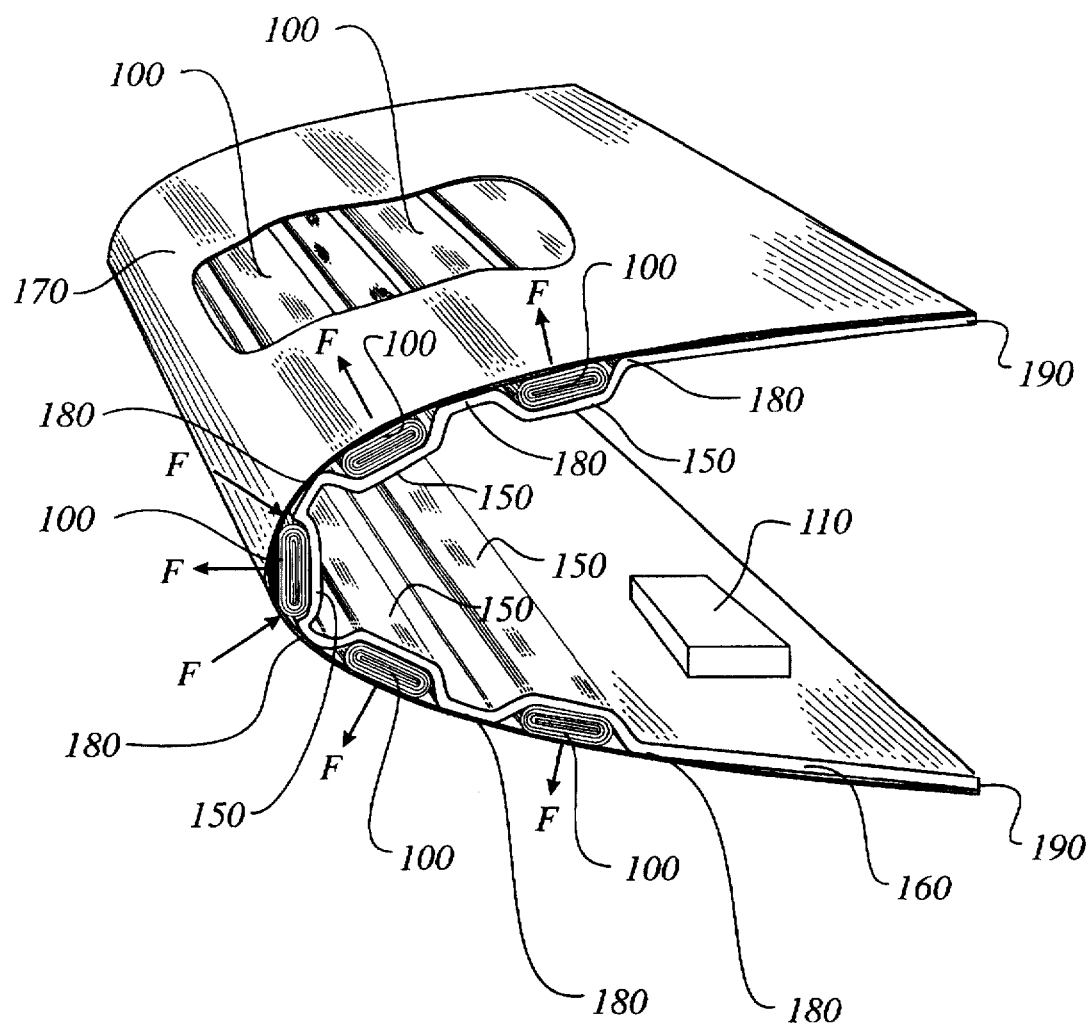
FIG. 1 depicts a perspective view through a cross section of a typical airfoil having an electro-magnetic expulsion de-icing system in accordance with the principles of the invention.
Figure 2:
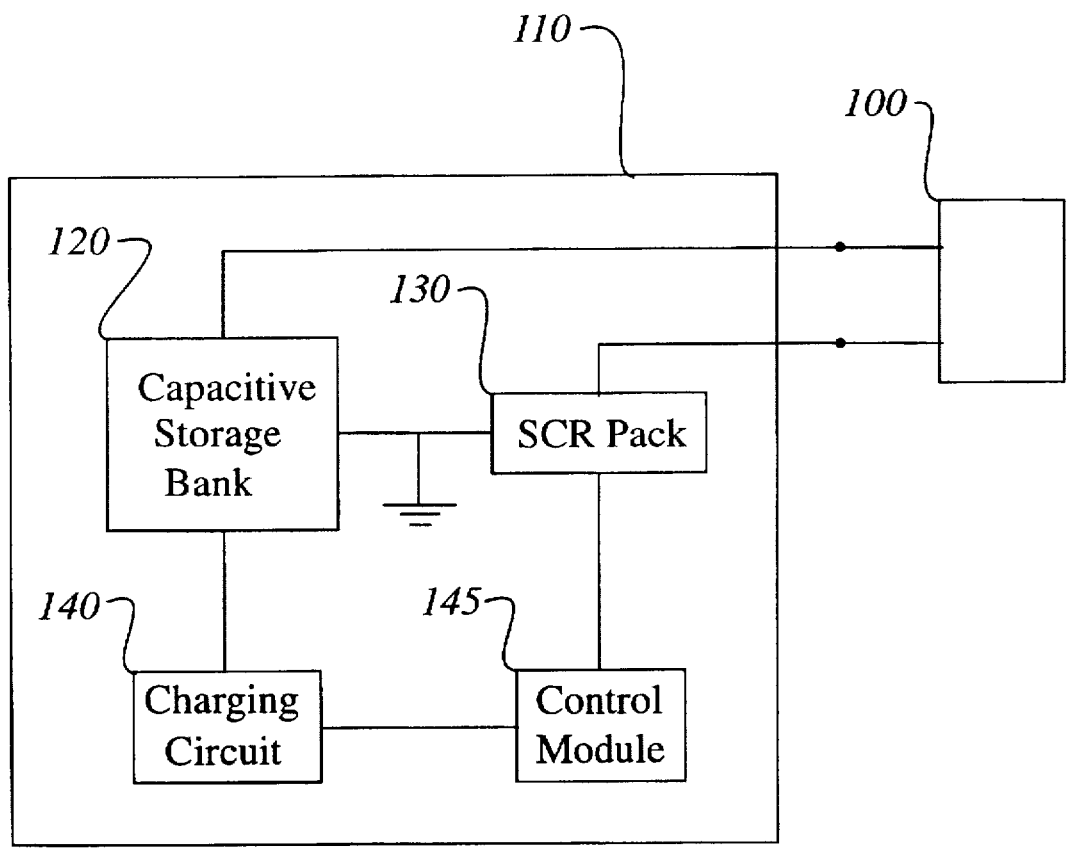
FIG. 2 depicts a block diagram of the driver electronics shown in FIG. 1.

Referring to FIGS. 1 and 2, the present invention is a de-icing system employing electro-magnetic actuator(s) 100 mounted within the airfoil of an aircraft. The de-icing system further includes driver electronics 110 that houses for each actuator or desired group of actuators, a capacitive storage bank 120, a silicon control rectifier (SCR) switch 130, a charging circuit 140 and a control module 145. Some or all of the components of driver electronics 110 may be mounted or integrated with the airfoil or within a channel 150. Alternatively, driver electronics 110 may be mounted within the cabin of the aircraft. Although SCRs are preferred because of their solid state nature and cost, controlled thyristors may also be used.

Each actuator 100 includes conductive strip(s) fabricated on a flexible dielectric sheet, discussed more fully below. The dielectric sheet with the conductive strip(s) are wound into coil(s) with the actuator shaped into a flattened elongated tube. Importantly, the length of the tube is sufficient with respect to the generated electro-magnetic force to provide a lateral restraint that prevents the coil windings from displacing. Advantageously, such actuator coils, even with a high number of windings, can be actuated several tens of thousands of times without malfunctioning due to the displacement of the coil windings. The axis of the winding coil(s) is coincident with the longitudinal axis of the elongated tube. The elongated tube is selectively bonded to corrugated channels 150 of a housing 160. Corrugated channels 150 run preferably in a spanwise direction. Housing 160 may be integrated with the leading edge structure or may be shaped to conform to fit over the shape of the airfoil. In the latter instance, housing 160 may be bonded to the airfoil surface with very high bond (VHB) adhesive tapes or by mechanical means.

In some instances the curvature of the airfoil may be too sharp to use the flat profile of actuator(s) 100. Accordingly, fracture proof plastic shims may be bonded to the actuators to conform to the shape of the desired area of the airfoil, typically the edge of the airfoil.

Preferably, the axis of the coil windings are located substantially parallel to and beneath ice prone surfaces of an airfoil, such as the leading edges. Actuator(s) 100 and housing 160 are covered with a protective semi-rigid sheet 170 that is made of flexibly stiff, low weight and corrosion resistance material, such as stainless steel, titanium, aluminum, fiber composites or the like. Semi-rigid sheet 170 is preferably electrically conductive. Housing 160 is supported or fixed at support points 180 and is preferably fastened to housing 160 or the frame of the aircraft at points 190 that are located beyond the areas prone to icing. Likewise, this fastening may be accomplished through the use of VHB adhesive tapes or mechanical means.

It should be understood that semi-rigid sheet 170 can flex and lift off from support points 180. Those skilled in the art will readily note that the actual number and location of the support points depend on the aerodynamics load characteristics of the given airfoil. In particular, support points 180 are designed to counteract the aerodynamics loads due, for example, to the low pressure state on the upper portion of the airfoil. Uncompensated, this low pressure can cause the so-called state of "auto-inflation." Also, between each support point 180 and further aft until fastening point 190, there is a void between semi-rigid sheet 170 and housing 160. Such a void allows the surface of semi-rigid sheet 170 to deflect and vibrate so as to allow de-icing along chordwise directions.

Referring to FIG. 2, in operation, charging circuit 140 charges capacitive storage bank 120. When icing is detected on the airfoil, control module 145 triggers SCR 130 which in turn causes an instantaneous current to be discharged through the coil(s) of actuator(s) 100. Various well known ice sensors may be used, such as those disclosed in U.S. Pat. No. 5,191,791, which is incorporated herein by reference. Preferably, control module 145 actuates each actuator 100 in succession. The interaction between the current in the windings of the coil results in an impulsive electro-magnetic force, F, or excitation that causes the coil to rapidly expand from its flattened shape to a more oval shape. This expansion in turn exerts an impulsive force on the surface of semi-rigid sheet 170 which then distends and recoils, thereby expelling any ice accretions on the surface thereof. It should be understood that portions of semi-rigid sheet 170 located in between the coils and/or the support experience a force, F, acting along a direction opposite to the generated electro-magnetic force. This enhances the de-icing. Once actuated, the coil returns to its original shape due to the elasticity of the coil, particularly the sides of the windings, and the tension exerted inwardly by semi-rigid sheet 170.

One advantage of the present invention is the use of low $I^2t$ rated SCRS. The $I^2t$ rating is a measure of the amount of energy a device is able to absorb on a low duty cycle basis. The $I^2t$ rating is given as follows:

$$I^2t = \int_0^T I^2(t)dt$$

where $I^2t$ is the rating of the device in amperes$^2$/sec, t is the time, I(t) is the current as a function of time, and T is the time duration of the current.

Because the present invention uses short pulses of modest level current several hundreds of microseconds or less in duration, little heat is dissipated. Accordingly, SCRs having a $I^2t$ rating as low as 50 may be used for many de-icing applications. Advantageously, commercially available SCRs with such low ratings, such as Model CR8AM from Powerex Co., may be mounted on printed circuits, thereby reducing the overall bulk and cost of the de-icing system.

Figure 3:
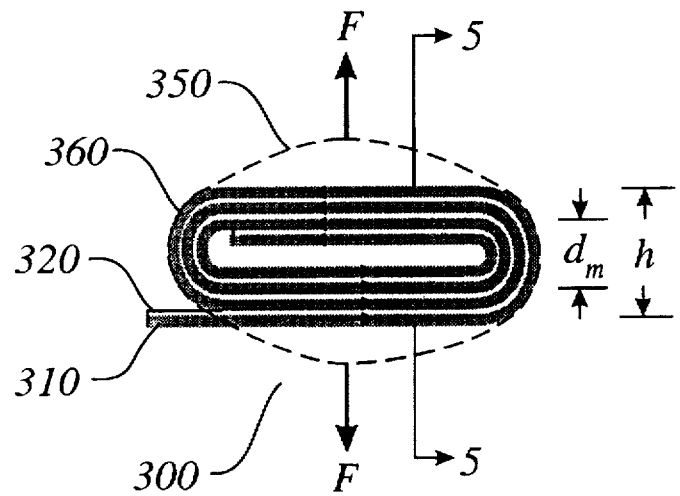
FIG. 3 depicts a cross sectional view of an electro-magnetic expulsion actuator in accordance with the principles of the invention.
Figure 4:
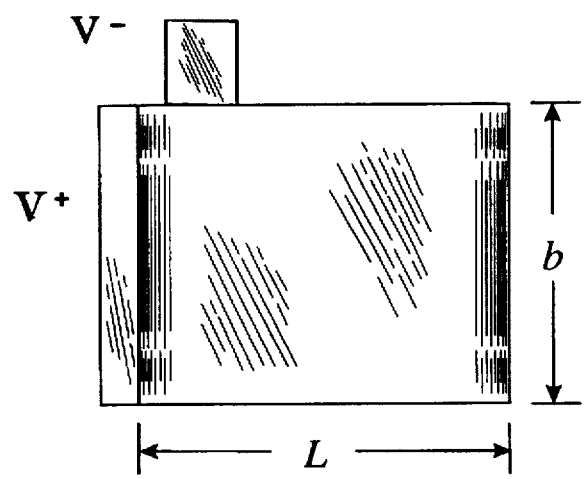
FIG. 4 depicts a top view of the electro-magnetic expulsion actuator of FIG. 3.
Figure 5:
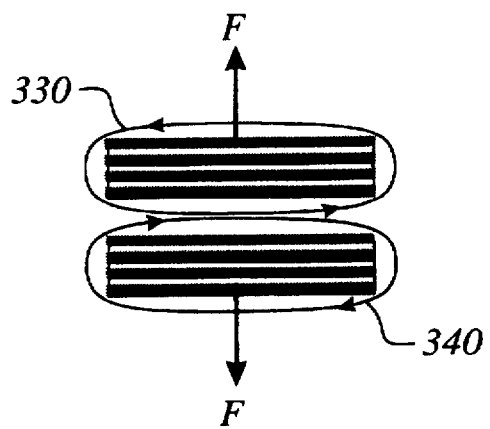
FIG. 5 depicts a cross sectional view of the electro-magnetic actuator taken along line 5—5 in FIG. 3.

An exemplary embodiment of an electro-magnetic de-icing actuator 300 in accordance with the principles of the invention is shown in FIGS. 3–5. De-icing actuator 300 comprises a conductive strip 310 disposed on a flexible dielectric thin sheet 320. Conductive strip 310 and dielectric thin sheet 320 are wound into a flattened elongated coil having multiple windings, thereby forming actuator 300. Dielectric thin sheet 320 prevents shorting between each individual winding. Preferably, de-icing actuator 300 comprises a plurality of conductive strips so as to form a plurality of parallel spaced apart coils (not shown). Shown in FIG. 4 is a top view of de-icing actuator 300.

In operation, a voltage, V, applied between the ends of the actuator coil, such as though contact tabs or terminals, causes current to flow, giving rise to current paths within the windings in mutually opposite directions as illustrated in FIG. 3 by the arrows. In particular, current in the top windings of the coil flows in one direction whereas current in the bottom windings flows in the other direction. As illustrated in FIG. 5, the resulting magnetic fields 330 and 340 within each winding bundle produces a repulsive force, F, that distends each half of the coil along a direction substantially perpendicular to the flow of current. More specifically, the actuator coil distends to the oval shape depicted by a dash line 350.

For each coil, the actuation force, F, is approximately given by:

$$F = \frac{C_1 L N^2 I^2}{b} \left[ \tan^{-1} \frac{b}{d_m} - \frac{d_m}{2b} \ln \frac{d_m^2 + b^2}{d_m^2} \right] \frac{\text{newtons}}{\text{meters}}$$

where L is the length of the coil, $C_1$ is $4 \times 10^{-7}$, b is the width of the conductive strip, $d_m$ is the mean separation between the winding bundles, I is the current in the coil, and N is the number of turns in the coil. This approximation is only valid for the mean separation $d_m$ much greater than the thickness of the conductive strip, a, assuming equal thickness of the upper and lower windings.

In operation, the generated electro-magnetic force tends to displace the coil windings laterally or from their functional position. To counteract this, the length of the tube, $L_{tube}$, is judiciously chosen with respect to the generated electro-magnetic force, F, and the length of the coil(s) so as to provide a lateral restraint that prevents the windings from displacing. This lateral restraint is caused by, among other things, the stability and rigidity associated with the flattened geometrical shape of the tube. Experimentation indicates that the tube length should preferably be equal to or greater than the length, L, of the coils: $L_{tube}/L \geq 1$. Those skilled in the art will readily note that in FIGS. 3 and 4, the width, b, of the coil is equal to the tube length. It is contemplated that the width of the coil, however, could be a fraction of the tube length.

To better understand the performance of de-icing actuator 300, the inter-relationship among various physical dimensions of de-icing actuator 300 with respect to the generated force and the power requirements will be discussed. Those skilled in the art will readily note that the force, F, is strongly dependent on the number of turns, N. However, increasing the number of turns will also increase the mean winding bundle separation, $d_m$, thereby tending to decrease the actuation force. To counteract this, it is contemplated that the conductive strips are kept substantially thin such that the term $N^2$ is dominant.

Further, those skilled in the art will also readily note that the coil height, h, is one of the primary design considerations for a de-icing system. The coil height, h, varies with the design constraints imposed by the specific application. To maximize the force, F, the greatest number of turns, $N_{max}$, should be used and is given by:

$$N_{max} = \frac{h_{max}}{2(a_{min} + t_{min})}$$

$$h_{max} = 2d_m$$

where $a_{min}$ is the minimum thickness of the conductive strips, and $t_{min}$ is the minimum thickness of the dielectric, and $h_{max}$ is the maximum allowable height of the coil. It should be noted that reducing the thickness of the conductive strips increases the resistance, R, of the coil because the cross-sectional area through which the current flows is reduced.

The resistance, R, has been derived to be given by:

$$R = \frac{2NL}{ab} R_c (\text{ohms})$$

$$L = \frac{N^2 \mu_o l d_m}{b}$$

where R is resistance of the coil, $R_c$ is the resistivity of the conductor, ab is the cross sectional area of the conductor, L is the inductance of the coil, and $u_o$ is the permeability of free space.

Further, the voltage required to generate a given current I is given by:

$$I = \frac{V}{R + Z_0}$$

$$Z_0 = \sqrt{\frac{L}{C}}$$

where I is the current, V is the applied voltage, $Z_o$ is the characteristic impedance of the coil, and C is the capacitance of the energy source.

Accordingly, to tailor de-icing actuator 300 to the specific physical design and power constraints, the physical dimensions of the conductive strips can be judiciously fabricated in accordance with the above equations.

The operation of the present invention may be further better understood by reference to the fabrication steps of various de-icing actuators in accordance with the principles of the invention. In these instances, the de-icing actuator consists of a plurality of coils formed from parallel spaced apart conductive strips. Referring to FIG. 6, a thin conductive film 600 (shown here as an etched pattern) is fabricated on a dielectric sheet 610. Preferably, the conductive film is made of copper due to its high conductivity and low cost. Polyimide, also known as Kapton, is the preferred material for dielectric sheet 610 because of its high tensile strength, dielectric constant and heat resistance. The high heat resistance advantageously allows contacts to be soldered to the conductive strips without harming the dielectric. Sheets of polyimide already deposited with copper are manufactured and sold by Sheldahl Co. under the tradename "Novaclad". Such sheets are also distributed by Rogers Co. under the tradename Flex-I-Mid™.

Conventional circuit board fabrication techniques, which are well known in the art, may be used to generate a serpentine or digitated pattern of parallel spaced apart conductive strips 600. In fabricating conductive strips 600 on dielectric sheet 610, standard masking and etching techniques may be used. It should be understood, however, that other fabrication techniques that directly deposit the serpentine or digitated pattern on the dielectric may also be used, which techniques may be more cost effective.

Shown in FIG. 7 is cross sectional view of conductive strips 600 and dielectric sheet 610.

Preferably, conductive strips 600 are selectively etched such that the width gradually tapers. In this manner, the stress near the edges of the conductive strips is reduced, which in turn reduces the potential for the conductive strips to crack away from the dielectric.

After the serpentine or digitated pattern is etched, the sheet consisting of conductive strips 600 and dielectric sheet 610, called the clad, is rolled up along direction 620 to form an elongated tube having parallel spaced apart coils 630 which are electrically connected in series, as shown in FIG. 8. Conductive portions 635 are used as contacts for applying a voltage to coils 630. Preferably, a dry lubricant is applied to the conductive strips to minimize friction and prevent corrosion. It should be understood that the number of coils and the spacing between them are dependent on the dimensions and spacing of the conductive pattern required for the specific application.

Alternatively, the clad may be rolled along direction 640 to form an actuator coil 650, as shown in FIG. 9. In particular, judiciously separating conductive strips 600 apart allows them to lay atop of one another when rolled, thereby forming single actuator coil 650. Of course, the separation between the conductive strips must be progressively increased along the direction of rolling to account for the fact that the perimeter of each winding coil increases with each subsequent roll. Coil 650, however, similarly operates in the same manner as discussed above.

Once the clad is wound, a strip of VHB strength transfer adhesive tape is used to bond the last two windings together to prevent the coils from unwinding. Next, the tube is flattened into an elongated shape so as to fit into, for example, the corrugated channels of the housing supporting the actuators, as illustrated in FIG. 1.

Next, the elongated tube is heat treated while held flat so that the windings on the sides of the coils and the dielectric sheet act as a spring to assist in returning the elongated tube to its original flattened shape after actuation. Moreover, the tendency for the coil windings to telescope out from the center is substantially eliminated by the flattening and heating. As discussed above, this tendency is substantially eliminated when $L_{tube}/L$ is greater than or equal to 1. Subsequently, a protective layer of Kapton adhesive tape may be applied to the outside of the elongated tube to electrically insulate and protect it from wear and tear. When actuated, the coil windings distend and slip over one another rather than stretching. Advantageously, this prevents the coil(s) from cracking due to fatigue.

Figure 10:
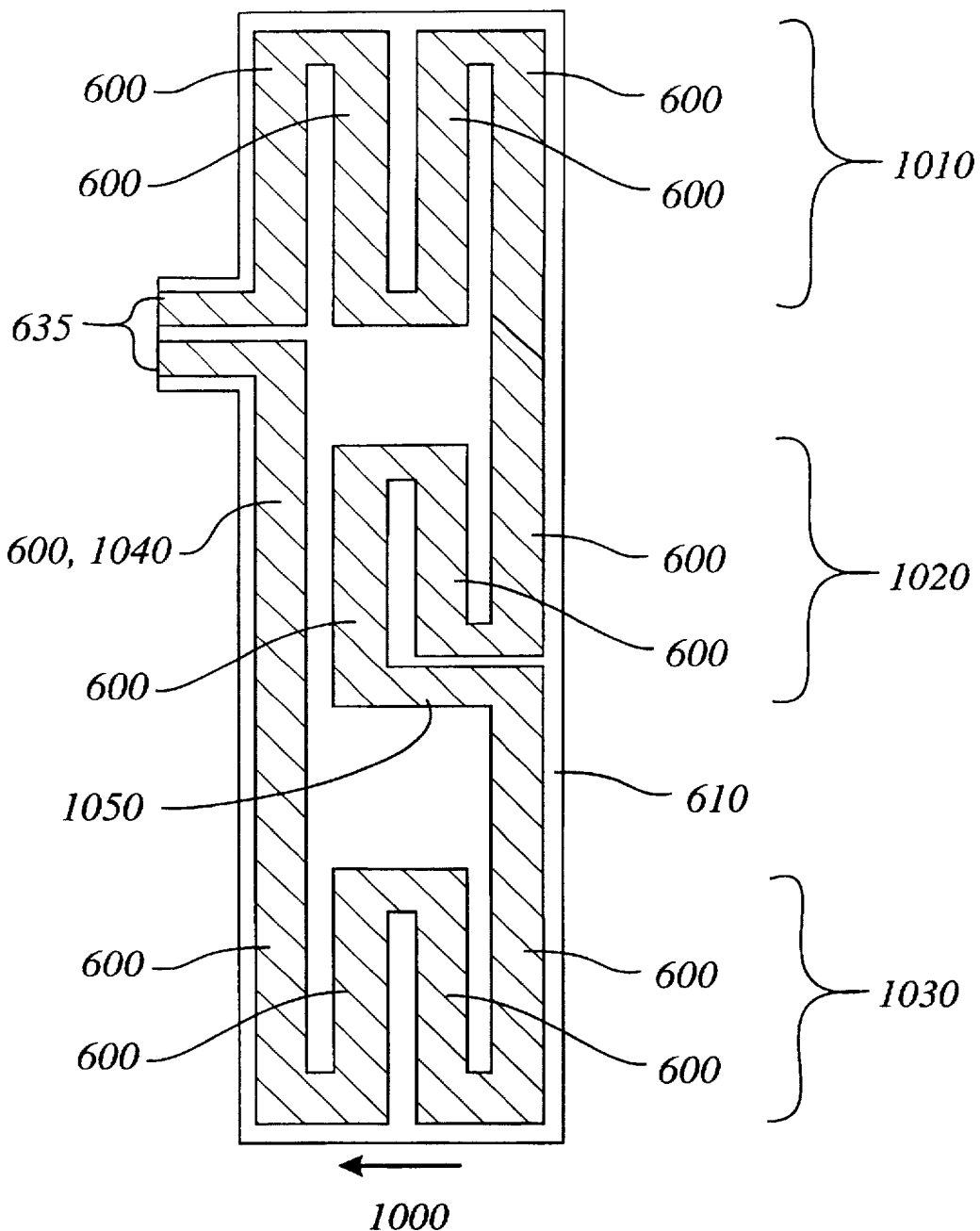
FIG. 10 depicts an alternative serpentine or digitated pattern used in fabricating an electro-magnetic expulsion de-icing actuator in accordance with the principles of the invention.

Shown in FIG. 10 is an alternative serpentine or digitated pattern that may be used in the present invention. Dielectric sheet 610 and conductor strips 600 when rolled along a direction 1000 form actuator coils from portions 1010, 1020 and 1030. Each actuator coil is similar in operation to actuator coil 650 of FIG. 9, but are connected in series. Actuator coils formed from portions 1010 and 1030 are identical. The actuator coil formed from portion 1020, however, differs slightly in that one of coil layer 600, 1040 is itself used for the return current. Coil portion 1050 interconnects the actuator coil formed from portion 1020 to the actuator coil formed from portion 1030. It is contemplated that actuator coil portion 1050 is required with this serpentine or digitated patterns when three or more actuator coils are connected in series.

In an example from experimental practice, an electromagnetic expulsion actuator consisting of four actuator coils was fabricated from copper conductive strips using the serpentine or digitated pattern of FIG. 6 and rolled along direction 620. Specifically, the conductive strips were fabricated on a 0.0005" thick dielectric sheet of polyimide with the following coil parameters: L=0.75", b=0.75", h=0.2", $d_m$=0.1", a=0.0007", and N=75. The tube length, $L_{tube}$, is 14". As such, $L_{tube}/L$ is ~18.

Experimental testing indicates that a discharge supplied from a 250 micro-farad capacitor bank charged to 550 volts causes approximately 500 amperes to flow through the coils. The discharge time was approximately 100 micro-seconds. Due to electro-magnetic expulsion, a force of approximately 77 pounds of peak impulsive force is generated in each actuator coil. Installation of the experimental de-icing actuator within an airfoil, as shown in FIG. 1, further confirms the actuator's capability of effectively removing ice accretion at least 0.05" thick from an area of approximately 18" spanwise and 4" chordwise.

Figure 11:
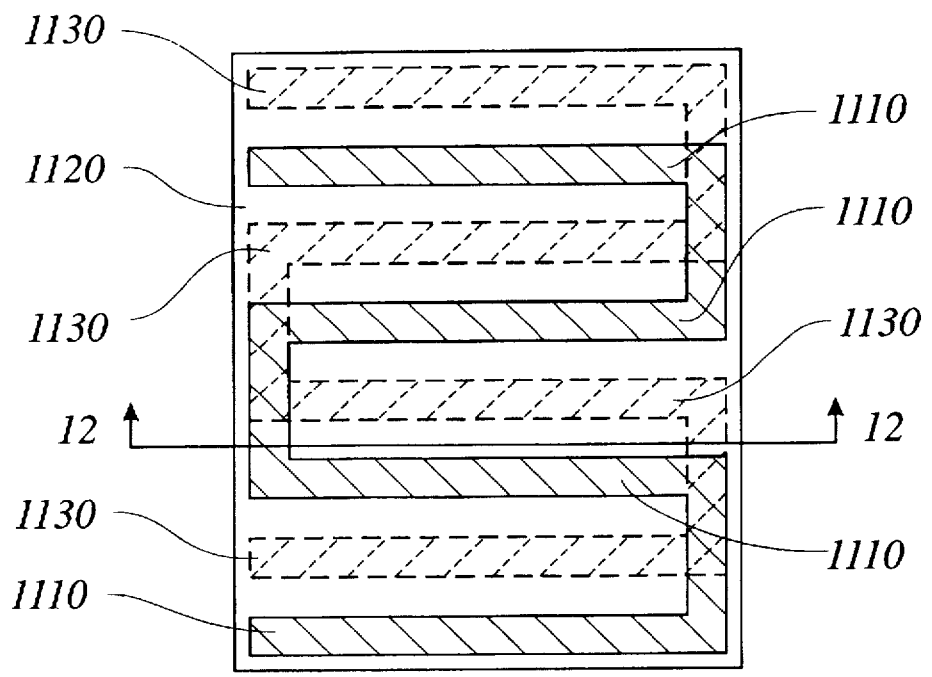
FIG. 11 depicts another alternative serpentine or digitated pattern having redundant conductive strips fabricated on the opposite side of the primary conductive strips.
Figure 12:
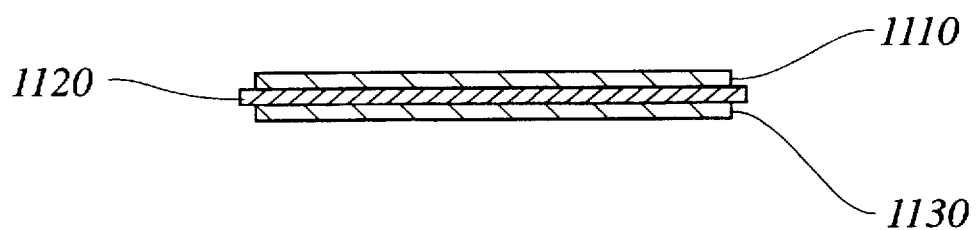
FIG. 12 depicts a cross sectional view of the serpentine or digitated pattern, and the dielectric sheet taken along line 12—12 in FIG. 11.

In other embodiments, the serpentine or digitated patterns may also use redundancy configurations wherein redundant conductive strips are fabricated on the same or opposite side of the dielectric sheet. Shown in FIG. 11 is an exemplary redundancy configuration depicting a serpentine or digitated pattern of primary conductor strips 1110 disposed on one side of a dielectric sheet 1120. Fabricated on the opposite side of dielectric sheet 1120 is a serpentine or digitated pattern of redundant conductive strips 1130. Preferably, redundant conductive strips 1130 are offset or staggered with respect to primary conductive strips 1110 to avoid shorting and minimize thickness. When rolled into an elongated tube, primary conductive strips 1110 and redundant conductive strips 1130 form pairs of parallel spaced apart primary and redundant coils, respectively, interlaced in an alternating fashion. FIG. 12 depicts a cross-section view of primary and redundant conductive strips 1110, 1130 and dielectric sheet 1120. In the event of a failure of the primary coil(s), the redundant coil(s) may be used to effect de-icing.

Figure 13:
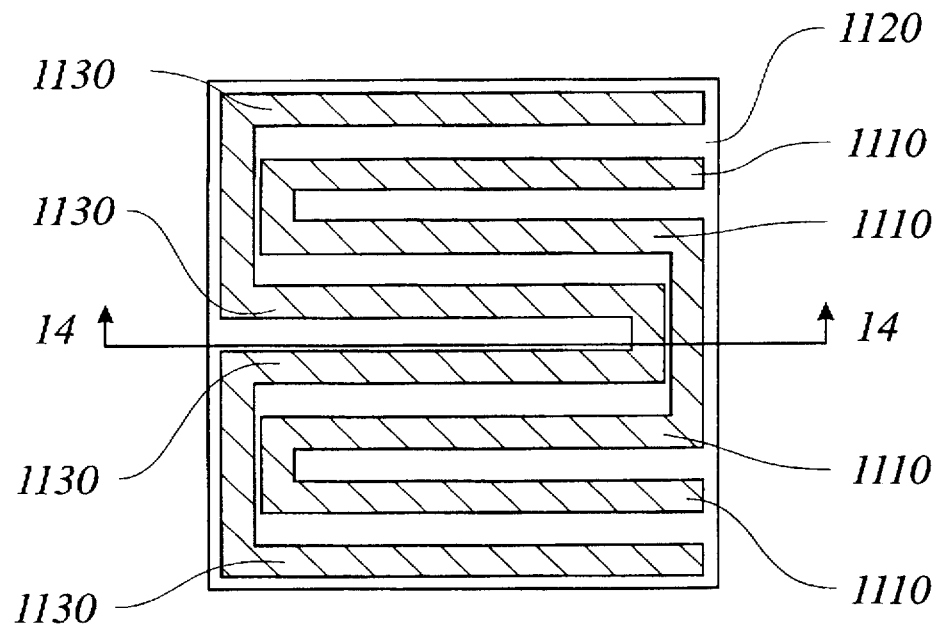
FIG. 13 depicts another alternative serpentine or digitated pattern having redundant conductive strips fabricated on the same side as the primary conductive strips.
Figure 14:
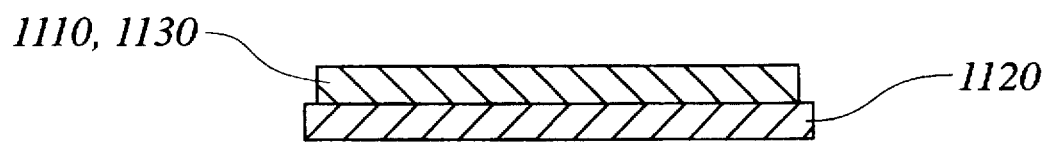
FIG. 14 depicts a cross sectional view of the serpentine or digitated pattern, and dielectric sheet taken along line 14—14 in FIG. 13.
Figure 15:
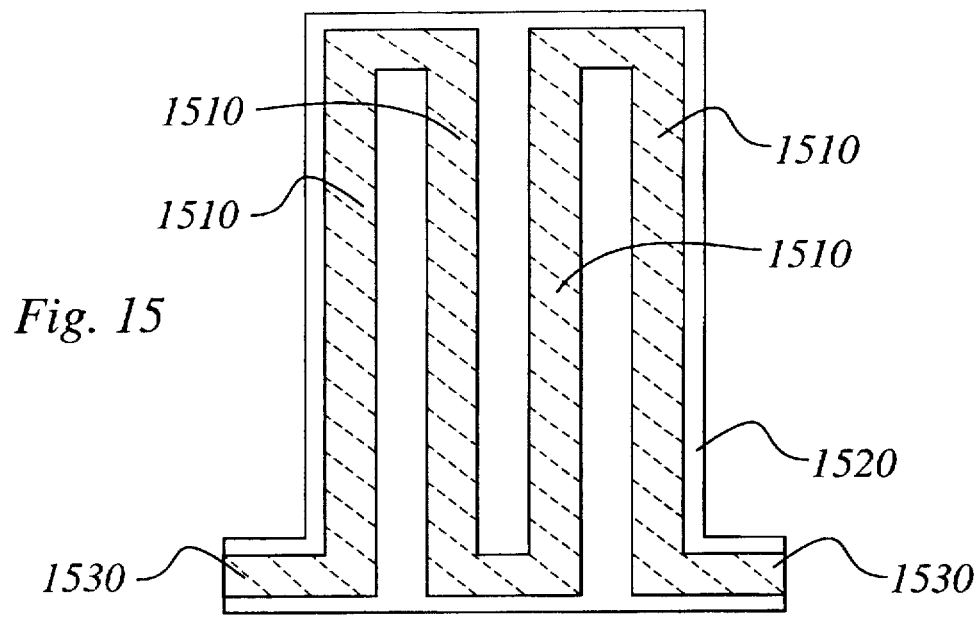
FIG. 15 depicts a serpentine or digitated pattern used in fabricating an electro-magnetic expulsion actuator for housing with a power bus.

Alternatively, primary conductive strips 1110 and redundant conductive strips 1130 may be fabricated on the same side of dielectric sheet 1120, as shown in FIGS. 13 and 14.

Figure 16:
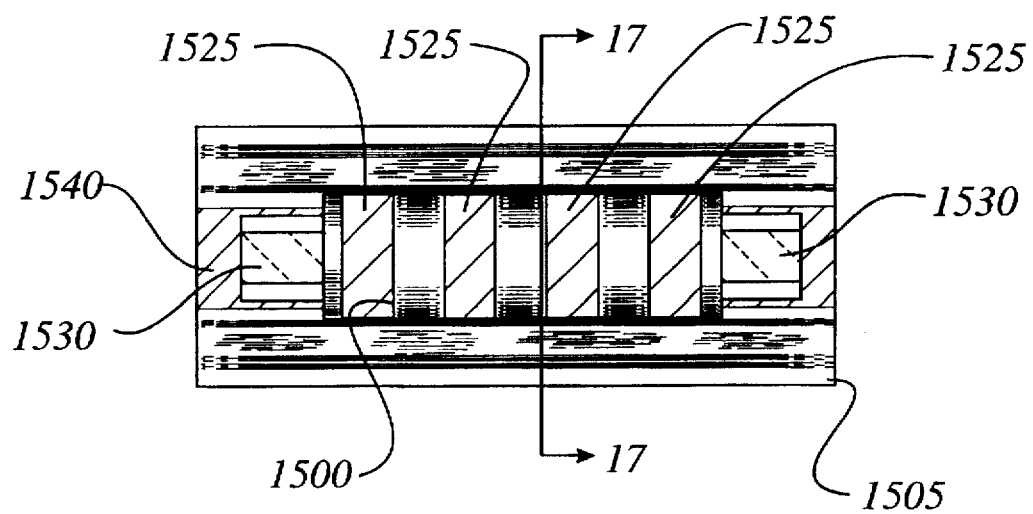
FIG. 16 depicts a plan view of an electro-magnetic expulsion actuator housed within a channel and bonded to a power bus in accordance with the principles of the invention.
Figure 17:
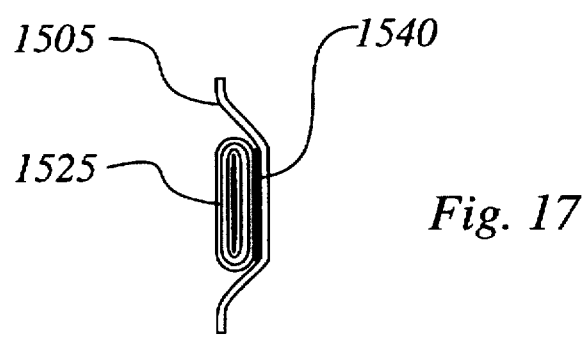
FIG. 17 depicts a cross sectional view of the electro-magnetic expulsion actuator bonded within a channel to a power bus and taken along line 17—17 of FIG. 16.

Alternative serpentine or digitated patterns may also be used to facilitate the use of a power bus integrated with, for example, a corrugated channel supporting the de-icing actuators. Referring to FIGS. 15-18, de-icing actuator coils 1525 comprises conductive strips 1510 disposed on a flexible dielectric thin sheet 1520. Conductive strips 1510 include terminal tabs 1530. Likewise, conductive strips 1510 and dielectric thin sheet 1520 are wound into a flattened elongated tube to form actuator coils 1525 having multiple windings. A power bus 1540 provides the current necessary to actuate the actuator(s) and is bonded into a corrugated channel 150. Each actuator 1525 is bonded to power bus 1540 with the exposed surface of terminal tabs 1530 electrically contacting corresponding contact tabs (not shown) of power bus 1540. Preferably, power bus 1540 and actuator 1525 are bonded with VHB adhesive tapes. Shown in FIG. 16 and 17 are top and cross sectional views, respectively, of actuator 1525 and power bus 1540 bonded within corrugated channel 150.

When redundant actuator coils are used, those coils are fabricated with terminal tabs that face outward from the contact tabs of the power bus. These latter terminal tabs are soldered to the power bus by folding them to expose their conductive surfaces to the contact portions of the power bus.

Figure 18:
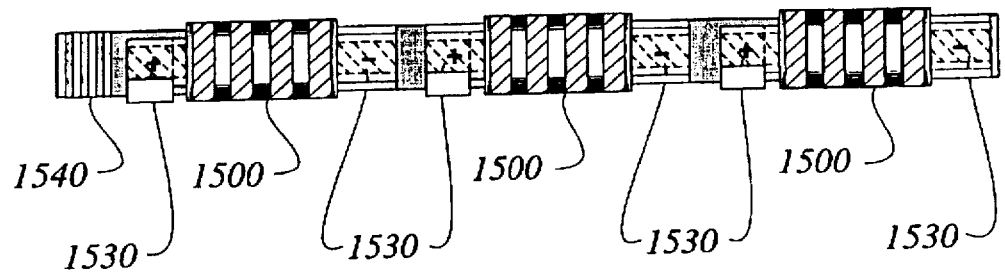
FIG. 18 depicts a top view of a plurality of electro-magnetic expulsion actuators bonded to a power bus.
Figure 19:
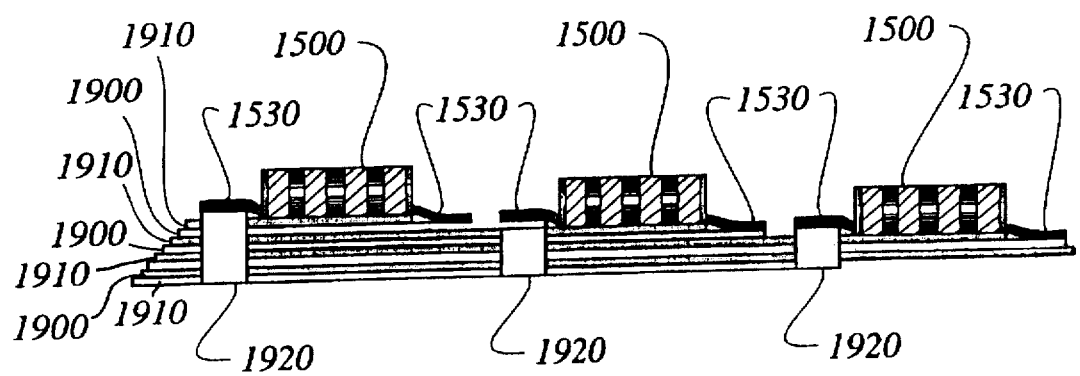
FIG. 19 depicts a side view of the plurality of electro-magnetic expulsion actuators and power bus of FIG. 18.
Figure 20:
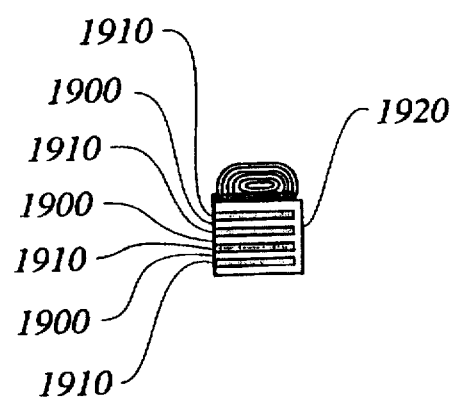
FIG. 20 depicts an end view of the plurality of electro-magnetic expulsion actuators and power bus of FIG. 19.

To more fully understand and appreciate the structure of power bus 1540, shown in FIGS. 18, 19 and 20 are top, side and end views, respectively, of a plurality of actuators 1525 connected to power bus 1540. Power bus 1540 comprises alternating layers of conductive and dielectric layers 1900 and 1910, respectively, such as copper and polyimide layers. Advantageously, these conductive and dielectric layers may be fabricated from the same materials used to fabricate the actuators. Conductive and dielectric layers 1900 and 1910 are bonded together with VHB adhesive tape. A common bus layer 1920 connects to the positive terminals of each actuator 1500. As such, terminal tabs of common bus layer 1920 that connect to the positive terminal tabs 1530 of actuators 1500 are insulated so as not to short to the other layers. Also, the terminal tabs are folded to expose its conductive surface upwards. Conductive layers 1900 contact corresponding negative terminal tabs 1530 of each actuator coil 1525.

Referring again to FIG. 3, it should be understood that the curved end portions of the actuator coils also generate magnetic fields that interact, causing them to undesirably repel each other. This parasitic effect worsens when the coil length is shortened such as when attempting to minimize the size of the actuator. To counteract this parasitic effect, it is contemplated that various geometrical shapes may be used for the conductive strips.

Figure 22:
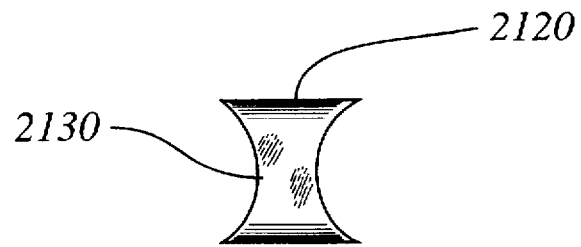
FIG. 22 depicts a top view of a single coil winding formed from the conductive strip of FIG. 21.
Figure 21:
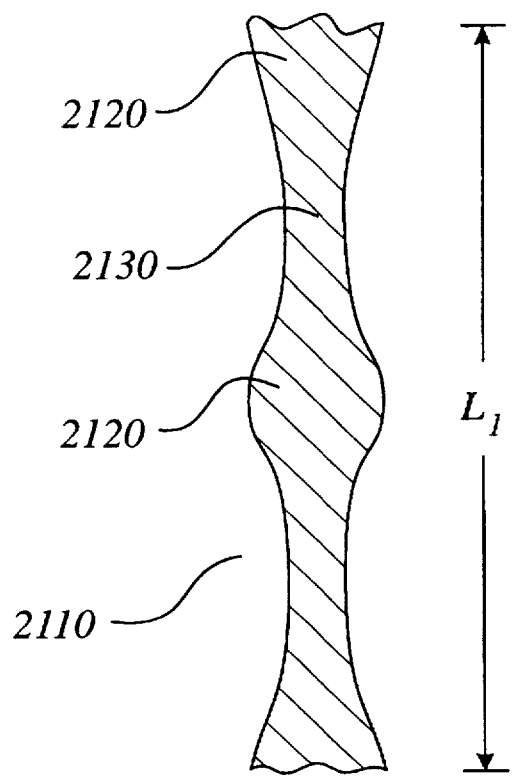
FIG. 21 depicts an alternative geometrical shape for the conductive strips used in the coil windings of the present invention.

Shown in FIG. 21 is a conductive strip 2110 having undulating or repeating wide and narrow portions 2120 and 2130, respectively. When rolled, wide and narrow portions 2120, 2130 form the ends and the horizontal areas of the coil windings, respectively. It should be noted the length $L_1$ is just sufficient to achieve one complete coil winding and increases for each subsequent winding to account for an increase in its perimeter. With the ends of the coils widen, the above described parasitic effect is reduced because of the lower magnetic field and resistance now associated with the ends. Similarly, the narrower horizontal areas increase the electro-magnetic expulsion force because of the strengthened magnetic field. Shown in FIG. 22 is a top view of a single coil winding formed from conductive strip 2110.

Figure 24:
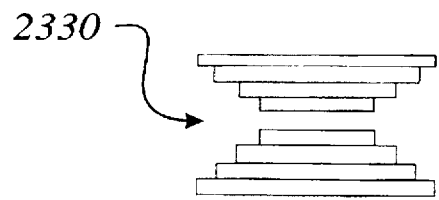
FIG. 24 depicts a cross sectional view of a coil formed from the conductive strip of FIG. 23.
Figure 23:
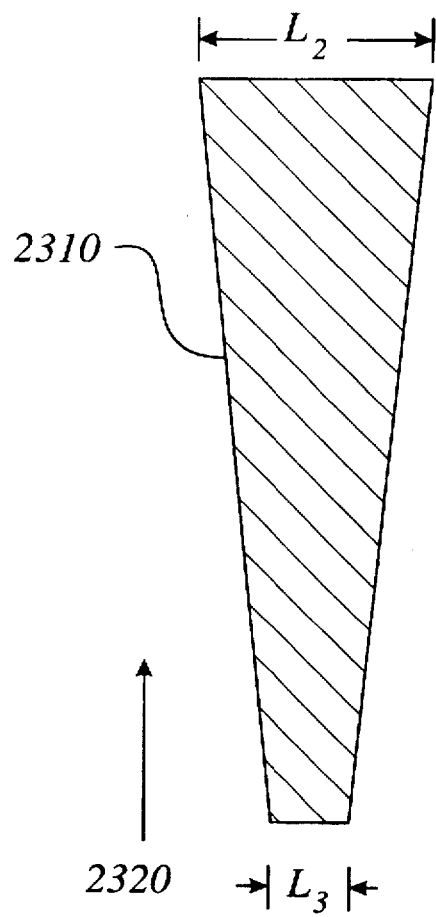
FIG. 23 depicts another alternative geometrical shape for the conductive strips used in the coil windings of the present invention.

Shown in FIG. 23 is a conductive strip 2310 having an alternative geometrical shape used to reduce internal stress and enhance the electro-magnetic expulsion force. Conductive strip 2310 is linearly tapered—narrowing from a width $L_2$ to a width $L_3$. When rolled along a direction 2320, conductive strip 2310 forms a coil 2330 having a cross-section geometry as shown in FIG. 24. Advantageously, this winding geometry permits the windings of coil 2330 to have a lower internal stress between each winding. This is so because a larger load bearing area is provided from the innermost to the outermost coil windings. Although the force per winding decreases from the innermost to the outermost windings due to the increasing width of the windings, this is more than compensated for by the fact than the innermost windings are more closely spaced. Indeed, it is has been determined that a tapered geometry coil generates a greater force per current flow than a constant width coil having the same mean thickness, resistance, and number of windings.

It is also contemplated that the width of the conductive strips may be continuously varied so as to yield a higher concentration of narrow innermost coil windings and wide outermost coil windings. Further, the conductive strips may use a combination of different coil geometries, including the taper and undulating geometries discussed above.

Figure 25:
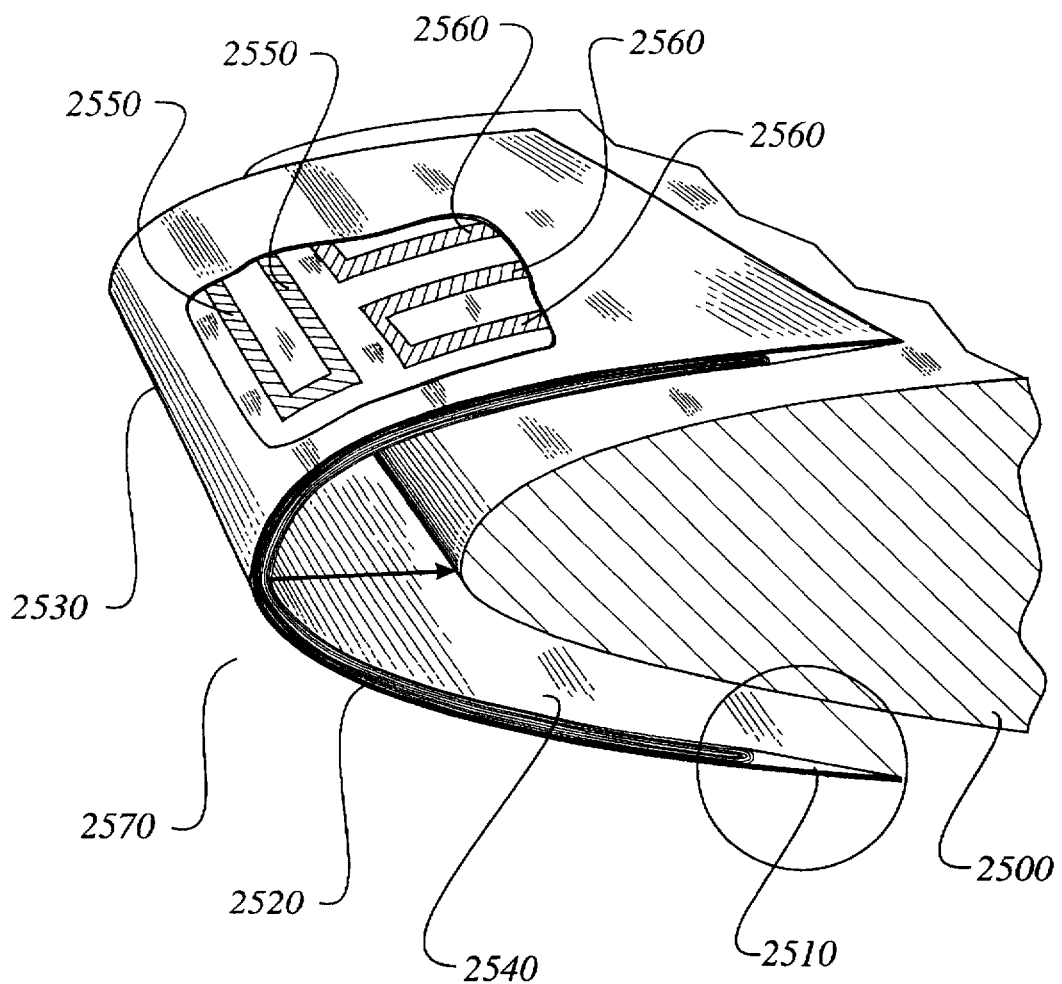
FIG. 25 depicts a perspective view through a cross section of a typical airfoil having an alternative embodiment of the electro-magnetic expulsion de-icing system in accordance with the principles of the invention.

Shown in FIG. 25 is another embodiment of the present invention in which a de-icer 2570 is installed over an airfoil 2500. De-icer 2570 uses an actuator 2520 similar to that of FIGS. 8 or 9, except that the length of the coil, L, is sufficiently long so as to cover a substantial portion of airfoil 2500 along a chordwise direction. It is contemplated that actuator 2520 completely wraps around ice prone areas of airfoil 2500. The edge of de-icer 2570 has an erosion shield 2530 that covers actuator 2520. Erosion shield 2530 is fastened to airfoil 2500 at filleted region 2510 by VHB adhesive tapes or mechanical fasteners. The underside of de-icer 2570 includes an electrically insulative sheet 2540. Actuator 2520 is bonded to insulative sheet 2540 which in turn is bonded to airfoil 2500.

Preferably, actuator 2520 includes spanwise and/or chordwise conductive strips 2550 and 2560, respectively, that form corresponding coils. Spanwise conductive strips 2550 effect de-icing at or near the regions of the airfoil having sharp curvatures, such as those near the edge of the airfoil. Those skilled in the art will readily note that spanwise conductive strips minimize the hoop strain effect of the outwardly expanding winding bundles. Chordwise conductive strips located in those latter regions are susceptible to fatigue. Moreover, chordwise conductive strips do not effectively effect de-icing at or near curved surfaces. This is so because such conductive strips stretches erosion shield 2530 rather than bending it which is more effective.

Figure 26:
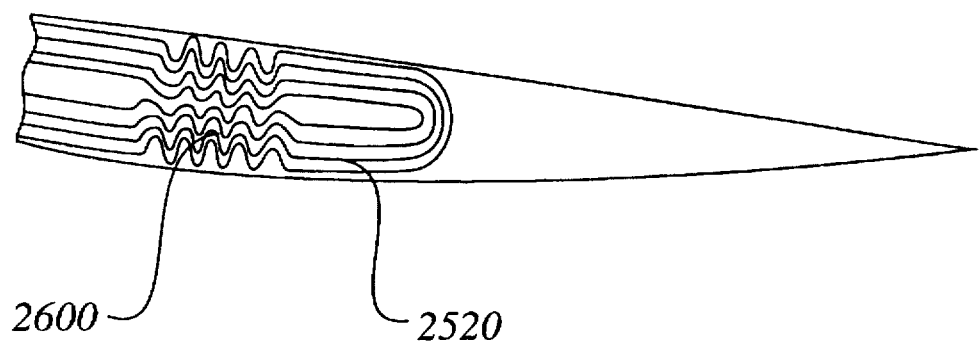
FIG. 26 depicts an enlarged portion of the filleted region of FIG. 25.

Regardless of the orientation of the conductive strips, the dielectric sheet on which the conductive strips are fabricated on expands outwardly when actuator 2520 is actuated. As such, this sheet experiences hoop strain, resulting in fatigue as well reduced power efficiency. Shown in FIG. 26 is an enlarged portion of filleted region 2510. To counteract the hoop strain, the insulative sheet and/or the conductive strips of actuator 2520 is fabricated with corrugations 2600 at various locations of the wrap-around portions thereof. Such corrugations may be formed with chordwise or spanwise conductive strips by restraining and heat treating the desired portions of actuator 2520. Importantly, when actuator 2520 is actuated, corrugations 2600 expand sufficiently to relieve the hoop strain.

It should be understood that various modifications will be readily apparent to those skilled in the art without departing from the scope and spirit of the invention. Accordingly, it is not intended that the scope of the claims appended hereto be limited to the description set forth herein, but rather than the claims be construed as encompassing all the features of the patentable novelty that reside in the present invention, including all features that would be treated as equivalents thereof by those skilled in the art to which this invention pertains.

We claim:

1. An elongated and mechanically deformable electromagnetic actuator adapted for radial deformation normal to its longitudinal axis of elongation comprising:

a flexible dielectric sheet; and a flexible conductive strip disposed on said dielectric sheet, said dielectric sheet and conductive strip being shaped as a flattened and elongated tube, said conductive strip being wound into a coil around said longitudinal axis, whereby said sheet and strip become less flattened and more cylindrical when an electrical current is passed through the strip.

2. The electro-magnetic actuator of claim 1 wherein said elongated tube has a length, $L_{tube}$, along the longitudinal axis, and said coil has a length, L, along a direction perpendicular to said longitudinal axis, and wherein $L_{tube}/L$ is sufficiently large to prevent the windings of the coil from displacing with respect to each other.

3. The electro-magnetic actuator of claim 2 wherein $L_{tube}/L$ is substantially greater than or equal to 1.

4. The electro-magnetic actuator of claim 1 wherein said flexible dielectric sheet is made of polyimide.

5. The electro-magnetic actuator of claim 1 wherein said flexible conductive strip is made of copper.

6. The electro-magnetic actuator of claim 1 further comprising a power bus, said power bus having alternating conductive and dielectric layers, and said coil having first and second terminal tabs extending outwardly, one of said alternating conductive layers contacting said first terminal tab.

7. The electro-magnetic actuator of claim 6 wherein another alternating conductive layer contacts said second terminal tab.

8. The electro-magnetic actuator of claim 1 wherein said flexible conductive strip has repeating wide and narrow portions.

9. The electro-magnetic actuator of claim 1 wherein said flexible conductive strip has a tapering width.

10. An electro-magnetic actuator adapted for mounting on an airfoil, said actuator comprising:
a flexible dielectric sheet; and
flexible conductive strips disposed on said flexible dielectric sheet, said flexible dielectric sheet and flexible conductive strips being rolled into a tube and the tube being substantially flattened into a sheet that fits on the airfoil, each of the flexible conductive strips being thereby wound into a coil that, when energized, changes the shape of the actuator.

11. An elongated and mechanically deformable electro-magnetic actuator adapted for radial deformation normal to its longitudinal axis of elongation comprising:
a flexible dielectric sheet having first and second sides; and
a first plurality of spaced apart flexible conductive strips disposed on the first side of said dielectric sheet, said dielectric sheet and first plurality of spaced apart conductive strips being shaped as a flattened and elongated tube, each of said first plurality of spaced apart conductive strips being wound into a corresponding primary coil around said longitudinal axis, whereby said sheet and strips become less flattened and more cylindrical when an electrical current is passed through the strips.

12. The electro-magnetic actuator of claim 11 wherein said elongated tube has a length, $L_{tube}$, along the longitudinal axis, and each of said primary coils has a length, $L$, along a direction perpendicular to said longitudinal axis, and wherein $L_{tube}/L$ is sufficiently large to prevent the windings of the primary coils from displacing with respect to each other.

13. The electro-magnetic actuator of claim 12 wherein $L_{tube}/L$ is substantially greater than or equal to 1.

14. The electro-magnetic actuator of claim 11 wherein said first plurality of spaced apart flexible conductive strips has a serpentine pattern.

15. The electro-magnetic actuator of claim 11 wherein each of said corresponding primary coils is electrically connected to each other.

16. The electro-magnetic actuator of claim 15 wherein each of said corresponding primary coils is electrically connected in series.

17. The electro-magnetic actuator of claim 15 wherein each of said corresponding primary coils is electrically connected in parallel.

18. The electro-magnetic actuator of claim 11 wherein said first plurality of spaced apart flexible conductive strips are substantially parallel to each.

19. The electro-magnetic actuator of claim 11 wherein said flexible dielectric sheet is made of polyimide.

20. The electro-magnetic actuator of claim 11 wherein each of said first plurality of spaced apart flexible conductive strips is made of copper.

21. The electro-magnetic actuator of claim 11 wherein each of said first plurality of spaced apart flexible conductive strips has a tapering width.

22. The electro-magnetic actuator of claim 11 further comprising a second plurality of spaced apart flexible conductive strips disposed on the first side of said dielectric sheet, each of said second plurality of spaced apart conductive strips being wound into a corresponding redundant coil.

23. The electro-magnetic actuator of claim 22 wherein said primary and redundant coils are staggered along said longitudinal axis.

24. The electro-magnetic actuator of claim 11 further comprising a second plurality of spaced apart conductive strips disposed on the second side of said dielectric sheet, each of said second plurality of spaced apart flexible conductive strips being wound into a corresponding redundant coil.

25. The electro-magnetic actuator of claim 24 wherein said primary and redundant coils are staggered along the longitudinal axis of the elongated tube.

26. The electro-magnetic actuator of claim 11 further comprising
a power bus, said power bus having alternating conductive and dielectric layers, and
each corresponding primary coil having first and second terminal tabs extending outwardly, said alternating conductive layers contacting one of said first terminal tabs.

27. The electro-magnetic actuator of claim 26 wherein one of said alternating conductive layers contacts each of said second terminal tabs.

28. The electro-magnetic actuator of claim 11 wherein each of said first plurality of flexible conductive strips has repeating wide and narrow portions.

29. The electro-magnetic actuator of claim 11 wherein each of said first plurality of flexible conductive strips has a tapering width.

30. The electro-magnetic actuator of claim 10 wherein said flexible conductive strips run chordwise.

31. A de-icing system comprising:
a housing, at least a portion of which has a channel;
an elongated and mechanically deformable electro-magnetic actuator adapted for radial deformation normal to its longitudinal axis of elongation and being located within the channel, said actuator having
a flexible dielectric sheet, and
at least a first flexible conductive strip disposed on a first side of said dielectric sheet, said flexible dielectric sheet and said at least first flexible conductive strip being shaped as a flattened, elongated, and rolled-up tube such that said at least first flexible conductive strip is wound into at least a first coil having an axis of winding around said longitudinal axis;
a semi-rigid sheet covering said channel;
means for applying a current through said at least first coil, thereby causing said actuator to rapidly radially deform and to thereby exert a force, F, upon said semi-rigid sheet.

32. The electro-magnetic actuator of claim 31 wherein said elongated tube has a length, $L_{tube}$, along the longitudinal axis, and said at least first coil has a length, $L$, along a direction perpendicular to said longitudinal axis, and wherein $L_{tube}/L$ is sufficiently large to prevent the windings of the coil from displacing with respect to each other.

33. The electro-magnetic actuator of claim 32 wherein $L_{tube}/L$ is greater than or equal to 1.

34. The de-icing system of claim 31 wherein said means for applying a current includes
means for storing a capacitive charge,
means for charging said means for storing to a predetermined capacitive charge, and
means connected to said electro-magnetic actuator for discharging the predetermined capacitive charge through said at least a first coil.

35. The de-icing system of claim 34 wherein said means for discharging includes a rectifier switch.

36. The de-icing system of claim 31 wherein said at least first flexible conductive strip has repeating wide and narrow portions.

37. The de-icing system of claim 31 wherein said at least first flexible conductive strip has a tapering width.

38. The de-icing system of claim 31 wherein said first direction runs spanwise to said channel.

39. The de-icing system of claim 31 wherein said first direction runs chordwise to said channel.

40. The de-icing system of claim 31 wherein said at least a first flexible conductive strip includes a plurality of spaced apart flexible conductive strips disposed on said flexible dielectric sheet, each thereby forming a corresponding primary coil.

41. The de-icing system of claim 40 wherein said plurality of spaced apart flexible conductive strips has a serpentine pattern.

42. The de-icing system of claim 40 wherein each of said corresponding primary coils is electrically connected to each other.

43. The de-icing system of claim 40 further comprising a plurality of spaced apart flexible conductive strips disposed on the first side of said flexible dielectric sheet, each being wound into a corresponding redundant coil.

44. The de-icing system of claim 40 further comprising a plurality of spaced apart flexible conductive strips disposed on a second side of said flexible dielectric sheet, each being wound into a corresponding redundant coil.

45. The de-icing system of claim 40 further comprising
a power bus having alternating conductive and dielectric layers, and
each corresponding primary coil having first and second terminal tabs extending outwardly, each of said alternating conductive layers contacting one of said first terminal tabs.

46. The de-icing system of claim 45 wherein one of said alternating conductive layers contacts each of said second terminal tabs.

47. The de-icing system of claim 31 wherein said housing is integrated with a leading edge structure of an airfoil.

48. The de-icing system of claim 31 wherein said housing conforms to an airfoil.

49. The de-icing system of claim 31 wherein said semi-rigid sheet can flex and lift off said housing.

50. The electro-magnetic actuator of claim 10 wherein a portion of said flexible conductive strips has corrugations.

51. The electro-magnetic actuator of claim 10 wherein a portion of said flexible dielectric sheet has corrugations.

52. The electro-magnetic actuator of claim 10 wherein said flexible conductive strips run spanwise.

* * * * *

UNITED STATES PATENT AND TRADEMARK OFFICE
CERTIFICATE OF CORRECTION

PATENT NO : 5,782,435
DATED : July 21, 1998
INVENTOR(S): Ingram et al.

It is certified that error appears in the above-identified patent and that said Letters Patent are hereby corrected as shown below:

Title page, item [73] Assignee should read --Innovative Dynamics, Inc. --.

Claim 1 should read as follows:

1. An elongated and mechanically deformable electro-magnetic actuator adapted for radial deformation normal to its longitudinal axis of elongation comprising:
    a flexible dielectric sheet; and
    a flexible conductive strip disposed on said dielectric sheet, said dielectric sheet and conductive strip being shaped as a flattened and elongated tube, and said conductive strip being wound into a coil around said longitudinal axis,
whereby said sheet and strip become less flattened and more cylindrical when an electrical current is passed through the strip.

Claim 11 should read as follows:

11. An elongated and mechanically deformable electro-magnetic actuator adapted for radial deformation normal to its longitudinal axis of elongation comprising:
    a flexible dielectric sheet having first and second sides; and
    a first plurality of spaced apart flexible conductive strips disposed on the first side of said dielectric sheet, said dielectric sheet and first plurality of spaced apart conductive strips being shaped as a flattened and elongated tube, and each of said first plurality of spaced apart conductive strips being wound into a corresponding primary coil around said longitudinal axis,
whereby said sheet and strips become less flattened and more cylindrical when an electrical current is passed through the strips.

UNITED STATES PATENT AND TRADEMARK OFFICE
CERTIFICATE OF CORRECTION

PATENT NO : 5,782,435
DATED : July 21, 1998
INVENTOR(S): Ingram et al.

It is certified that error appears in the above-identified patent and that said Letters Patent are hereby corrected as shown below:

Claim 22 should read as follows:

22. The electro-magnetic actuator of claim 11 further comprising a second plurality of spaced apart flexible conductive strips disposed on the first side of said dielectric sheet, each of said second plurality of spaced apart flexible conductive strips being wound into a corresponding redundant coil.

Claim 24 should read as follows:

24. The electro-magnetic actuator of claim 11 further comprising a second plurality of spaced apart conductive strips disposed on the second side of said dielectric sheet, each of said second plurality of spaced apart conductive strips being wound into a corresponding redundant coil.

Signed and Sealed this

Twenty-third Day of February, 1999

Attest:

Q. TODD DICKINSON

*Attesting Officer*  *Acting Commissioner of Patents and Trademarks*